United States Patent [19]
Job

[11] 3,956,848
[45] May 18, 1976

[54] INSECT POPULATION SERIALIZER
[75] Inventor: Donald D. Job, Sudbury, Mass.
[73] Assignee: GTE Laboratories Incorporated, Waltham, Mass.
[22] Filed: Apr. 3, 1975
[21] Appl. No.: 564,964

[52] U.S. Cl. .............................................. 43/115
[51] Int. Cl.² ........................................ A01M 1/14
[58] Field of Search ................ 43/114, 115, 116, 21

[56] References Cited
UNITED STATES PATENTS

| | | | |
|---|---|---|---|
| 875,828 | 1/1908 | Lafoon | 43/114 |
| 1,148,748 | 8/1915 | Brewer | 43/114 |
| 1,458,890 | 6/1923 | Levy | 43/115 |
| 1,577,148 | 3/1926 | Pical | 43/115 |
| 2,896,875 | 7/1959 | Reed et al. | 43/21 |

*Primary Examiner*—Warner H. Camp
*Attorney, Agent, or Firm*—Irving M. Kriegsman; Leslie J. Hart; Bernard L. Sweeney

[57] ABSTRACT

A device which is useful in determining the efficacy of various insect attractants and repellants. In particular, the device is useful for determining any time relationships which occur during the use of those attractants and repellants. The device has a web of "fly paper" which is continuously moved past an aperture in an outer housing at a known rate. A fresh supply of fly paper is stored in a roll at one end of the web and is supported on a first spindle journaled in the outer housing. The used fly paper is rolled and stored in a take-up roll at the other end of the web supported on a similarly journaled second spindle. The fly paper may be removed from the device and unrolled. By knowing the rate at which the fly paper was advanced originally, a time-dependent profile of the insects captured may then be determined. Furthermore, since the insects remain intact on the fly paper, the insects can be classified readily and time-dependent profiles by species and breed can also be made.

6 Claims, 2 Drawing Figures

INSECT POPULATION SERIALIZER

BACKGROUND OF THE INVENTION

The present invention relates generally to an apparatus for capturing insects and is more particularly concerned with a novel device for ascertaining the specific types and numbers of insects captured at a given time.

Many studies are being conducted presently relative to the effects of chemical substances and light and acoustic energies on insects. An effect of these substances and energies studied in the attractant and/or repellant characteristics relative to various species of insects. In order to determine accurately the effects of these substances and energies as attractants or repellants, it is necessary in many instances to ascertain the relationship that these attractants and repellants have on specific species of insects as a function of the time of exposure thereto. Furthermore, the effects of these attractants and repellants often differs markedly in time on various species of insects.

While laboratory studies can and are being conducted on insects with such attractants and repellants, the only true tests of the efficacies thereof are those conducted under necessary conditions in various field environments. Presently available equipment for capturing insects is unsuitable for ascertaining quantitative information in a continuous manner with the ability to determine time-dependent relationships. The presently known insect capturing equipment is intended primarily for capture of large numbers of insects over an extended period of time and cannot provide time-dependent insect capture data at a remote site.

If such field environment studies can be accomplished, scientists may be able to determine optimal times and conditions for chemical spraying to cause insect population control. Furthermore, such studies could easily yield data from which lighting, chemical or acoustic sources could be developed which when combined with localized concentrations of insecticides might allow insect population control without widespread spraying.

SUMMARY OF THE INVENTION

It is, therefore, an object of the present invention to provide a novel device which can be utilized to determine time-dependent relationships between the presence of insects and a wide variety of attractants and repellants for such insects.

It is a second object of the invention to provide such a device which is susceptible to field use in widely varying remote locations and environments.

It is a further object of the invention to provide such a device which is simple in construction and use.

The invention in its broadest aspect comprises an insect population serializer. The serializer has a closed outer housing with an aperture in one surface thereof. A pair of spaced, parallel spindles are journaled in the housing on opposite sides of the aperture. A web of fly paper passes between end rolls which are suspended on the respective spindles. One of the end rolls is a supply roll, while the other one is a take-up roll. The web of fly paper has a surface thereon to which insects adhere upon alighting. The opposite surface of the web is of a nonadherent nature. Finally, means are provided for continuously advancing the fly paper from the supply roll to the take-up roll at a rate which is predetermined, so that a fresh adherent surface is constantly being presented at the aperture. In this manner, since the rate of advancement is known, a time relationship between the specific insects captured and a time varying outside environment may be monitored.

Further objects, advantages, and features of the invention will be apparent from the following detailed description of the preferred embodiment taken together with the accompanying drawing.

DETAILED DESCRIPTION OF THE PREFERRED EMBODIMENT

Figure 1:
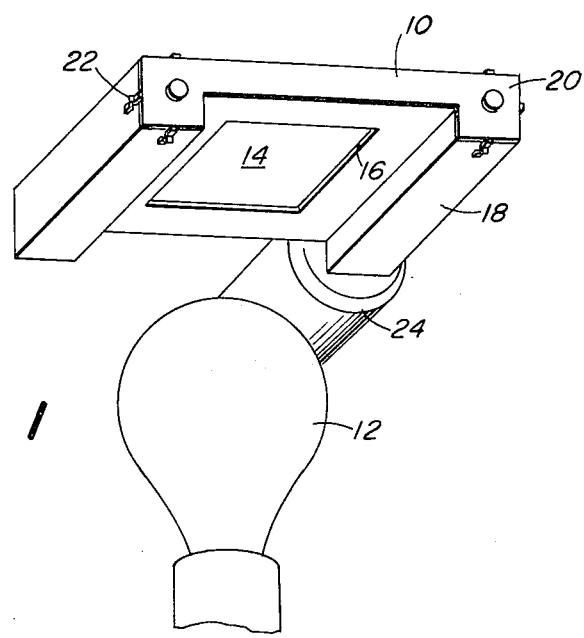
FIG. 1 is a bottom perspective view of a preferred embodiment of a device according to the present invention for establishing a time relationship of insects captured after exposure to a specific attractant or repellant.

In referring to the various figures of the drawing hereinbelow, like reference numerals will be utilized to refer to identical portions of the apparatus.

Referring now to the drawing, FIG. 1 shows an insect population serializer according to the present invention which is identified generally by the reference numeral 10. A light bulb 12 which emits light of a wavelength which is believed to be either repellant or attractive to a particular species of insects is shown generally as being disposed adjacent to the serializer 10. The light emitted by the bulb 12 is intended to alter the normal insect population in the area of the device 10 by either attracting or repelling insects. Although a light bulb is shown in the preferred embodiment of the invention, it should be understood that the use of this invention extends to all types of apparatus and chemical substances whose effect on an insect population one desires to understand.

The insect population serializer 10 includes a web 14 of "fly paper" which is exposed through an aperture 16 in an outer protective housing 18. In this embodiment of the invention, the aperture 16 is formed in the bottom surface of the housing 18. This position allows the body of the housing to shield the web 14 from the surrounding environment. This helps to prevent dislodging insects from the web 14 by rain and wind thereby improving the accuracy of the data achieved. However, it is within the purview of the invention that the aperture 14 be located in any surface of housing 18 which is desirable for a specific application.

The web 14 has been described as being formed of fly paper. As that term is used in this context, fly paper is intended to include any sheet-like material whether of paper, fabric, metal, or other construction onto which a substance which is strongly adherent to all manner of insects which one desires to capture can be deposited. The particular composition of the web and/or adhesive does not form a part of this invention. The web 14 is coated only on its exposed surface with the adherent material for reasons which will be explained hereinbelow.

A removable cover 20 is located at one end of the housing 18. The cover 20 is shown as being held in position by a plurality of spring clips 22 although any other means of so holding the cover is also permissible. The cover 20 carries a pair of spindles 26 and 28 an end of each of which is journaled in the cover 20. The other end of each of the spindles engages a bearing surface (not shown) in the rear of the housing 18.

The web 14 of fly paper includes a pair of end rolls which are suspended on the spindles 26 and 28. One of the rolls is a supply roll while the other end roll serves as a take-up roll. The web 14 is coated only on one surface so that the insects captured at the aperture 16 are not susceptible to removal while stored on the take-up roll. It is also within the purview of the invention to provide means for spacing layers of used fly paper of the take-up roll from each other to avoid crushing the insects captured. This facilitates the classification of the insects.

The web 14 is continuously advanced from the supply roll past the aperture 16 to the take-up roll at a known predetermined rate. This permits a definite reproducible relationship to exist between the portion of the web 14 exposed at the aperture 16 and the time of exposure. The web may then later be unrolled and examined to ascertain insect population trends in an environment which varies with time. The rate of advance is a matter of choice and depends upon the resolution desired and the period of time over which data is to be accumulated in a single web.

In this embodiment, the means for advancing the web 14 is a timing motor 24 which is mounted to the rear of the housing 18. The motor 24 has a shaft (not shown) which engages the take-up roll and advances the web 14. For use at remote installations, the motor 24 may be of a DC type so that it may be driven from a battery power source.

Figure 2:
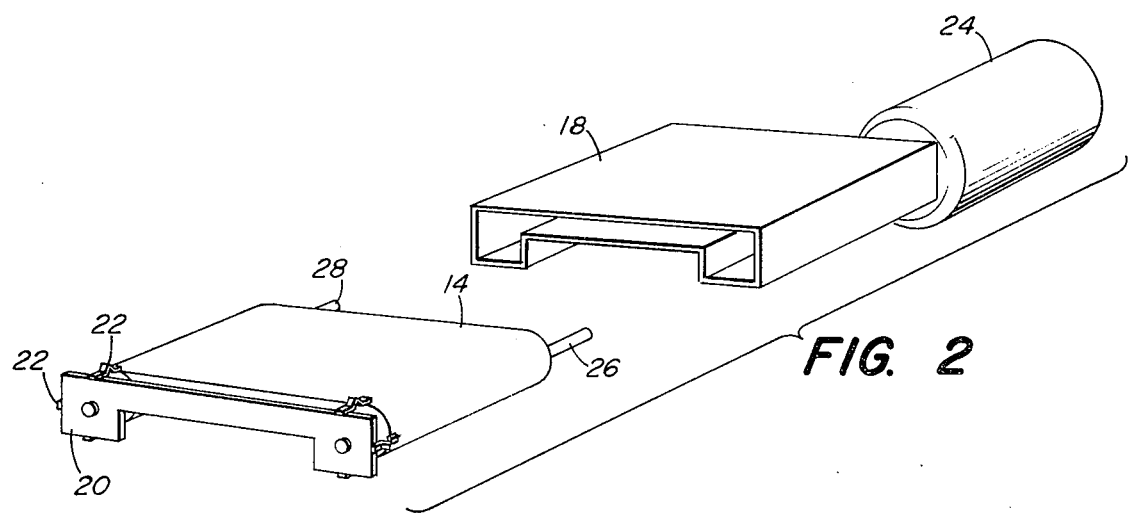
FIG. 2 is an exploded isometric view of the device shown in FIG. 1.

The particular arrangement for the serializer shown in FIG. 2 of the drawing is especially useful in remote installations. The adherent material web 14 is mounted in the form of a cassette including the cover 20 which may be removed from the housing and a new cassette substituted therefor. Upon removal of the used cassette, the web 14 may be unrolled from the take-up roll and the particular assortment and type of insects captured on the web 14 during the time that it was exposed in the aperture 16 may be determined. In this manner a definite time-dependent relationship may be established for any insect population trends upon exposure to various attractants and/or repellants.

While there has been shown and described what is considered to be a preferred embodiment of the present invention, it will be obvious to those of ordinary skill in the art that various changes and modifications may be made therein without departing from the spirit of the invention as defined by the appended claims.

I claim:

1. An insect population serializer for use in a field environment comprising
    a closed housing having an aperture in a lower surface thereof so that the housing shields the aperture from the surrounding environment,
    a pair of spaced, parallel spindles journaled in the housing on opposite sides of the aperture,
    a non-continuous web of fly paper passing between end rolls suspended on the respective spindles, one of the end rolls being a supply roll and the other being a take-up roll, the web of fly paper having a surface thereon to which insects adhere upon alighting thereon, the opposite surface of the web of fly paper being a nonadherent surface, and
    means for remotely and continuously advancing the fly paper from the supply roll to the take-up roll at a predetermined rate so that fresh adherent surface is constantly being presented at the aperture whereby, because the rate of advance is known, the time relationship between specific insects captured and a time varying outside environment may be monitored.

2. An insect population serializer according to claim 1, wherein there is further included means disposed adjacent to the closed housing for attracting insects to the vicinity of the housing.

3. An insect population serializer according to claim 1, wherein there is further included means disposed adjacent to the closed housing for repelling insects from the vicinity of the housing.

4. An insect population serializer according to claim 1, wherein the means for continuously advancing the fly paper is a DC timing motor powered by a DC source so that the serializer may be located at a remote site.

5. An insect population serializer according to claim 4, wherein the housing has a removable cover on one side thereof so that the fly paper may be removed from the housing.

6. An insect population serializer according to claim 5, wherein the fly paper and removable cover form a cassette for ready removal of the fly paper from the housing.

* * * * *